June 18, 1963 B. ZOPPI ET AL 3,094,652
BATTERY-CHARGING CIRCUITS ON MOTOR VEHICLES
Filed Jan. 31, 1962 3 Sheets-Sheet 1

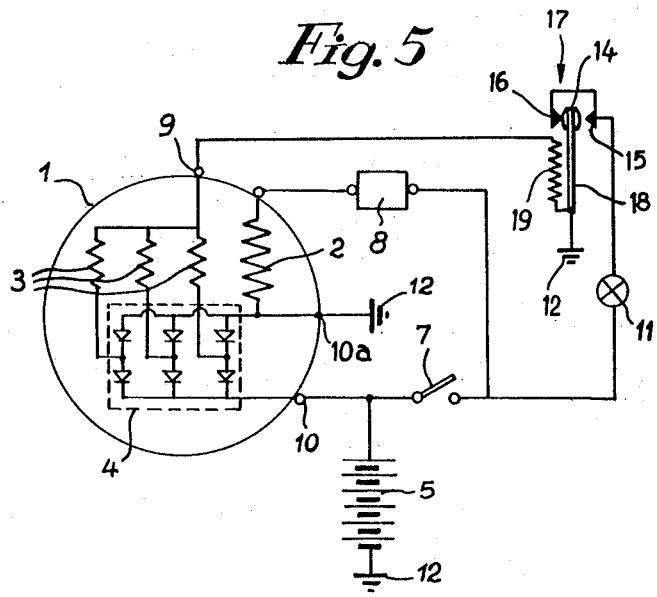
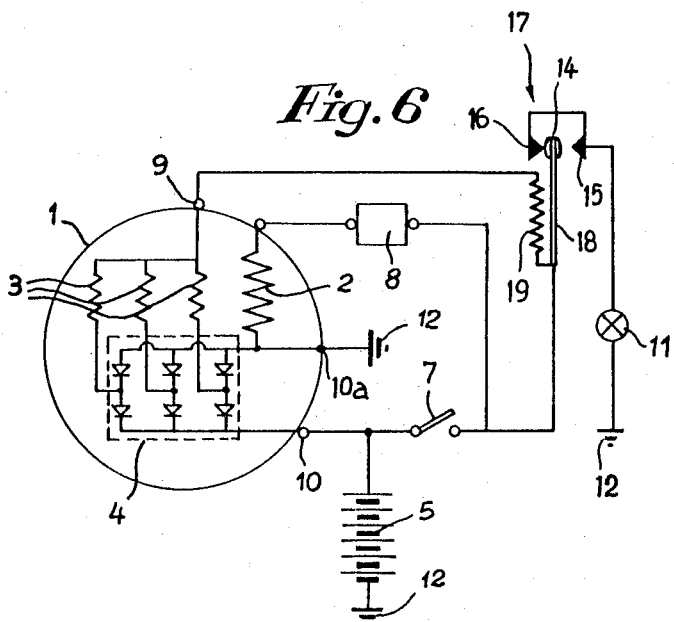

United States Patent Office 3,094,652
Patented June 18, 1963

3,094,652
BATTERY-CHARGING CIRCUITS ON
MOTOR VEHICLES
Bruno Zoppi, Ercole Premoli, and Fioraldo Tamburini, all of Turin, Italy, assignors to FIAT Societa per Azioni, Turin, Italy
Filed Jan. 31, 1962, Ser. No. 170,139
Claims priority, application Italy Mar. 18, 1961
3 Claims. (Cl. 320—48)

This invention relates to an electrical circuit for visual indication of operating conditions of a battery-charging system on a motor vehicle including a poly-phase alternating current generator with star-connected secondary windings and a full-wave rectifier.

In such electrical systems, the visual indicator circuit conventionally employed in direct current generator systems would be inoperative.

As is known, in the latter systems the visual indicator consists of a warning lamp connected in parallel with the contacts controlled by a voltage regulator. These contacts are open when the generator supplies no voltage or, rather, a voltage insufficient to charge the battery.

In the open contact position, the lamp is connected into a battery circuit including the secondary windings of the generator. Inversely, when the generator supplies enough voltage to charge the battery, the contacts close and short-circuit the warning lamp, thus turning it off.

In full-wave rectified alternating current automotive electrical systems, the impossibility of using a visual indicator circuit similar to the one described above is due to the fact that this circuit cannot close through the secondary winding due to the presence of the rectifier which prevents the flow of direct current through the secondary winding to ground.

In order to overcome these difficulties, this invention provides a visual charge-indicator circuit for automotive electrical systems equipped with a storage battery and a full-wave rectified alternating current generator, characterized in that the warning lamp (or its control relay) is connected between the star-center (neutral point) of the secondary windings and one of the two terminals of the battery.

Further features of the invention will appear from the following description, wherein reference is made to the accompanying drawings.

FIGURES 4, 5 and 6 are modifications of the diagram of FIG. 3.

Figure 1:
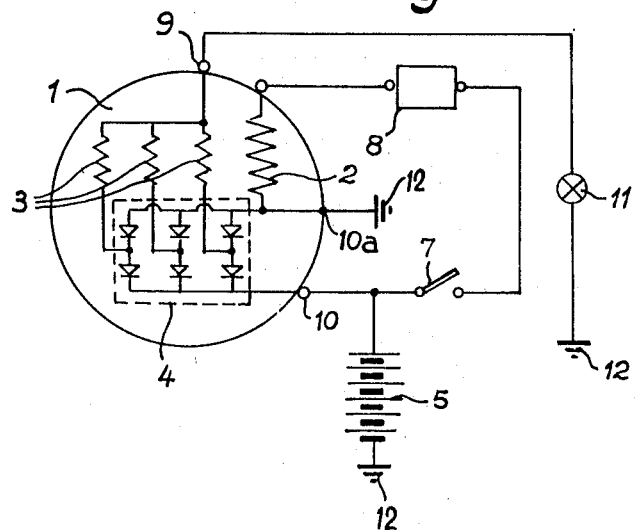
FIGURE 1 is a diagram of a circuit with direct energization of the visual indicator.

In FIGURE 1, an alternating current generator 1 is shown including an exciting winding 2 and a star-connected three-phase secondary winding 3 having associated therewith a three-phase full-wave rectifier 4. The three phases of the secondary winding are connected to the three respective inputs of the rectifier 4. The positive output terminal 10 of this rectifier is connected to the positive terminal of a storage battery 5 while the negative terminal 10a is connected to the negative terminal of the battery 5 through the ground 12 of the vehicle. The star-center of the secondary winding of the alternator is connected to a tap 9.

One end of the exciting winding 2 is connected to the negative terminal 10a, while the other end is connected to the positive terminal of the battery 5 through a voltage regulator 8 and a switch 7 controlled by a conventional engine-ignition key. The visual indicator consisting of a warning lamp 11 is connected between the tap 9 and ground 12.

Figure 2:
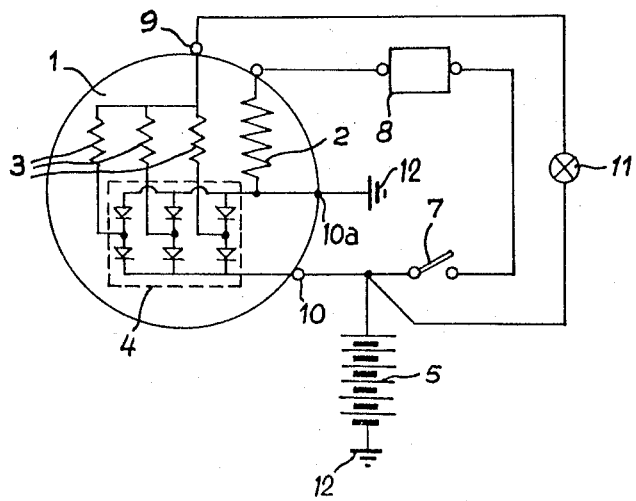
FIGURE 2 is a modification of FIGURE 1.

In the example of FIGURE 2, the structural lay-out is the same except that the warning lamp 11 is connected between the tap 9 and terminal 10, that is, between the star-center of the secondary winding and the positive terminal of the battery.

The improved electrical warning circuit utilises the following feature of a fully rectified poly-phase generator: when the generator is not delivering any E.M.F. (generator stopped or non-energised) the secondary winding 3 has an indefinite potential since it is then an insulated conductor. Therefore, the warning lamp 11 connected between points 9 and 12 in FIGURE 1 or between points 9 and 10 in FIGURE 2 does not light up.

Conversely, when the secondary winding 3 gives rise to an E.M.F. (rotating excited generator) the star-center has a potential with respect to ground and to the positive terminal of the rectified equal to half the D.C. voltage supplied by the rectifier 4 to the battery 5. Therefore, by connecting the lamp 11 between points 9 and 12 or between points 9 and 10 the lamp lights up with a definite light intensity.

Moreover, in the case of a short circuit of a rectifier element of the unit 4, which is the damage most frequently occurring to a rectifier, the three-phase system becomes unbalanced, the star center varies in potential, the lamp being fed with a voltage other than the normal one.

More particularly, with the lamp connected between 9 and 12 as in FIG. 1 a short circuit of a negative rectifier element causes the applied voltage to become about ¼ of the direct current voltage, the light intensity of the lamp 11 sinking considerably, while a short circuit of a positive rectifier element causes the voltage to become about ¾ of the direct current voltage, the light intensity increasing considerably.

With the lamp connected between the points 9 and 10, as indicated in FIG. 2, the warnings are reversed, more particularly, a short circuit of a negative rectifier element causes the applied voltage to become about ¾ of the direct current voltage, the light intensity of the visual indicator increasing, while a short circuit of a positive rectifier element causes the applied voltage to become about ¼ of the direct current voltage, the light intensity of the lamp 11 sinking accordingly.

With the generator at standstill a short circuit of a positive rectifier element results in a voltage between the star center and ground equalling the battery voltage (lamp on); similarly, with the generator at standstill a short circuit of a negative rectifier element leads to the same results.

Other damages to the generator are indicated by extinguishing of the lamp 11, or variations in the light intensity thereof.

Summarizing, with an efficient generator, the lamp is out at standstill of the generator and is on with a certain intensity when the generator is operative. In case of any damage to the generator the lamp lights up at standstill of the generator, or is off or on with a lower or higher light intensity, according to the damage and connection of the lamp, when the generator is in operation.

The control circuit for the visual indicator just described is quite inexpensive but not as convenient, because a damage to the recharging equipment is indicated by a variation in light intensity of the visual indicator or by extinguishing thereof. The diagrams shown in FIGS. 3 to 6 are adapted to obviate the above drawback by indicating the damage through lighting up of the visual indicator in a conventional manner in the automotive field.

Figure 3:
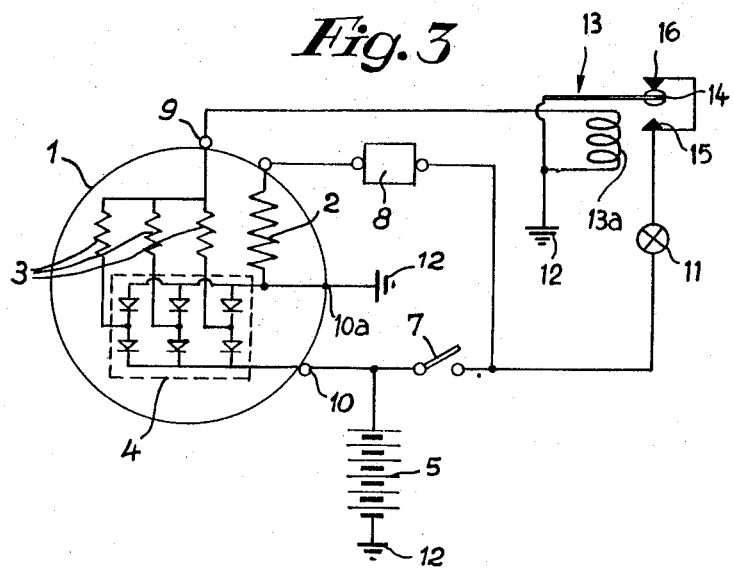
FIGURE 3 is a diagram of a circuit with a relay-controlled visual indicator.

In the embodiment shown in FIG. 3 the exciting winding 13a of an electromagnetic relay 13 is connected between the points 9 and 12. This relay moreover comprises an earthed movable contact 14 and two stationary contacts 15, 16. The contact 14 normally rests on the contact 16, thereby closing the circuit of the lamp 11 fed from the positive pole of the battery 5.

The contact pair 14—16 open when the voltage applied to the winding 13a is half the minimum direct current voltage supplied by the rectifier under normal operating conditions of the plant. When the voltage applied across the coil 13a of the relay exceeds half the maximum voltage of said direct current under normal operating conditions of the plant, the movable contact 14 reaches the stationary contact 15. The stationary contacts 15, 16 are electrically interconnected.

Operation is as follows:

(Ia) With the generator at standstill and operative rectifier the electric circuit over the ground 12, battery 5, switch 7, visual indicator 11, contacts 14—16 and ground 12 is closed, the visual indicator being on. The relay is deenergized.

(Ib) With the generator at standstill and a short-circuited damaged positive rectifier element, the electric circuit over the ground 12, battery 5, damaged positive rectifier element, field winding 3, coil 13a of the relay and ground 12 is closed. The relay is then energized by a voltage equalling the battery voltage but for slight falls in voltage in the field winding. Therefore, the contact pair 15 close, the circuit of the lamp 11 being likewise closed, whereby the lamp lights up to warn about the damage.

(Ic) With the generator at standstill and a short-circuited damaged negative rectifier element, the coil terminals of the relay are both grounded. The relay is deenergized, whereby the contact pair 14—16 remain closed, the feed circuit for the visual indicator 11 closing as in case 1a. Concluding, with the generator at standstill the visual indicator 11 is on in any case.

(IIa) When the generator is in operation and operation of the re-charging plant is satisfactory, the contacts 14—16 open, and contacts 14—15 do not close, inasmuch as the voltage across the coil of the relay is half the direct current voltage under normal operational conditions of the plant. Therefore, the lamp feed circuit is open, the lamp 11 being off.

(IIb) With the generator in operation and a positive rectifier element damaged by short-circuiting the voltage between 9 and 12 reaches ¾ of the direct current voltage. Therefore, the contacts 14—15 close, the visual indicator 11 being switched on.

(IIc) With the generator in operation and a negative rectifier element damaged by short circuiting the voltage between 9 and 12 becomes ¼ of the direct current voltage, this value being insufficient to release the contact 14 from contact 16, so that the warning lamp 11 remains on.

Concluding, when the generator is in operation and the charging circuit operates satisfactorily, the warning lamp 11 is off, while in any case and with any type of abnormal operation, whether it derives from insufficient excite of the alternating current generator or misadjustment of the voltage regulator 8 or other accident, the warning lamp 11 remains on.

It will be obvious that warning by the visual indicator is efficient and similar to the warning by the visual indicator associated with direct current generators on board of motor vehicles.

Figure 4:
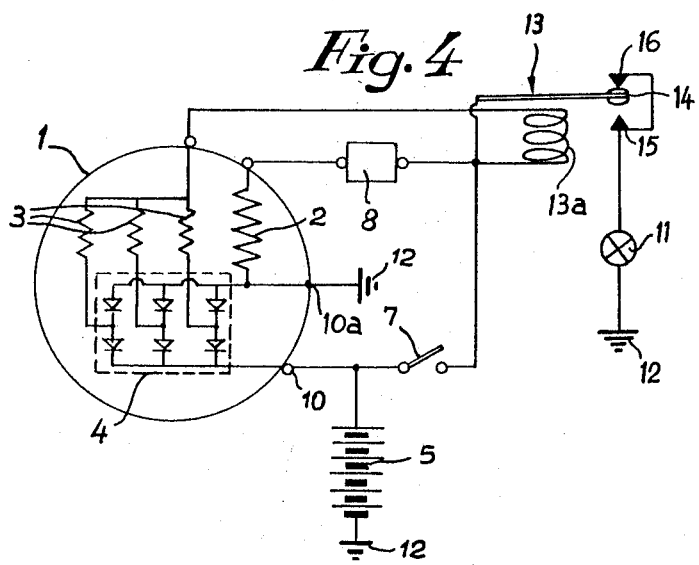

According to the modification shown in FIG. 4, the electromagnetic relay 13 is connected to perform a similar function as above described between the star center and positive battery terminal. In this case the movable contact 14 also is connected to the positive battery terminal, the lamp 11 being grounded.

FIGS. 5 and 6 correspond to the wiring diagrams in FIGS. 3 and 4, but for the circumstance that the electromagnetic relay 13 is replaced by a thermal relay 17. In this case the stationary contact pair 15—16 have cooperating therewith a bimetallic strip 18 carrying the contact 14, controlled by a resistance heating winding 19. In the embodiment shown in FIG. 5 the winding 19 is connected between the star center and negative terminal (ground 12) of the battery, while in the embodiment shown in FIG. 6 it is connected between the star center and positive battery terminal. In this case also the contact pair 14—16 are normally closed, the relay being identically set as previously described in connection with the electromagnetic relay.

It will be understood that the indirect connection through the switch 7 of the lamp 11 (FIGS. 3 and 5) or relay (FIGS. 4 and 6) to the positive battery terminal is due only to conventional safety reasons, tending to open all the circuits when the ignition key is removed from the instrument board switch.

What we claim is:

1. In a motor vehicle, a battery-charging circuit comprising a storage battery, a poly-phase alternating current generator including an exciting winding and a star-connected secondary winding providing the phase outputs for the alternating current, a full-wave poly-phase rectifier having its three inputs connected to the respective phase outputs and having its two output taps connected to opposite terminals of the battery, a voltage regulator operatively associated with the exciting winding and the battery thereby to automatically control the battery-charging conditions from the generator, and a voltage-responsive warning circuit branched between the star-centre of the secondary winding and a terminal of the battery.

2. In a motor vehicle, a battery-charging circuit comprising a storage battery, a poly-phase alternating current generator including an exciting winding and a star-connected secondary winding providing the phase outputs for the alternating current, a full-wave poly-phase rectifier having its three inputs connected to the respective phase outputs and having its two output taps connected to opposite terminals of the battery, a voltage regulator operatively associated with the exciting winding and the battery thereby to automatically control the battery-charging conditions from the generator, and a voltage-responsive warning circuit branched between the star-centre of the secondary winding and a terminal of the battery, said warning circuit including a relay having an energizing winding energized from the star-centre and the last named terminal of the battery arranged to operate the relay at a voltage value exceeding half the minimum direct-current voltage value delivered from the rectifier to the battery in normal operating condition of the charging circuit, and a warning lamp controlled by the relay.

3. In a motor vehicle, a battery-charging circuit comprising a storage battery, a poly-phase alternating current generator including an exciting winding and a star-connected secondary winding providing the phase outputs for the alternating current, a full-wave poly-phase rectifier having its three inputs connected to the respective phase outputs and having its two output taps connected to opposite terminals of the battery, a voltage regulator operatively associated with the exciting winding and the battery thereby to automatically control the battery-charging conditions from the generator, and a voltage-responsive warning circuit branched between the star-centre of the secondary winding and a terminal of the battery, said warning circuit including a double-throw relay having an energizing winding energized from the star-centre and the last named terminal of the battery, a pair of stationary contacts and a movable contact normally bearing against one of the stationary contacts in inoperative condition of the relay, said energizing winding being arranged to throw the movable contact off the said one of the stationary contacts when the voltage value across the energizing winding exceeds half the minimum direct-current voltage value delivered from the rectifier to the battery in normal operating condition of the charging circuit, and to further throw the movable contact into engagement with the other stationary contact when the voltage value across the energizing winding exceeds half the maximum direct-current voltage delivered from the rectifier to the battery in normal operating condition of the charging circuit; and a warning device arranged for being energized by the movable contact through said stationary contacts.

References Cited in the file of this patent

UNITED STATES PATENTS 3,026,465    Hallidy _____ Mar. 20, 1962